(12) United States Patent
Törmä et al.

(10) Patent No.: US 10,719,261 B2
(45) Date of Patent: Jul. 21, 2020

(54) USER SELECTABLE ERASURE AND DIAGNOSTIC METHOD AND SYSTEM

(71) Applicant: Blancco Technology Group IP Oy, Joensuu (FI)

(72) Inventors: Markus Törmä, Joensuu (FI); Daniel Öberg, Joensuu (FI)

(73) Assignee: BLANCCO TECHNOLOGY GROUP IP OY, Joensuu (FI)

( * ) Notice: Subject to any disclaimer, the term of this patent is extended or adjusted under 35 U.S.C. 154(b) by 0 days.

(21) Appl. No.: 16/138,569

(22) Filed: Sep. 21, 2018

(65) Prior Publication Data
US 2019/0095126 A1    Mar. 28, 2019

(30) Foreign Application Priority Data

Sep. 22, 2017 (GB) .................................. 1715407.1

(51) Int. Cl.
*G06F 3/06* (2006.01)
*G06F 11/32* (2006.01)
*G06F 3/0484* (2013.01)
*G06F 21/62* (2013.01)

(52) U.S. Cl.
CPC ........ *G06F 3/0652* (2013.01); *G06F 3/04842* (2013.01); *G06F 3/0605* (2013.01); *G06F 3/0673* (2013.01); *G06F 11/321* (2013.01); *G06F 21/6245* (2013.01); *G06F 2221/2143* (2013.01)

(58) Field of Classification Search
CPC ...... G06F 3/0605; G06F 3/0652; G06F 3/048; G06F 11/321
See application file for complete search history.

(56) References Cited

U.S. PATENT DOCUMENTS

| | | | |
|---|---|---|---|
| 7,475,203 B1 * | 1/2009 | Petrillo, Jr. ........... | G06F 3/0619 711/112 |
| 2015/0205539 A1 * | 7/2015 | Moon .................... | G06F 3/0679 711/103 |
| 2016/0342501 A1 * | 11/2016 | Venkatesan ......... | G06F 11/3684 |

* cited by examiner

Primary Examiner — Than Nguyen
(74) Attorney, Agent, or Firm — Snell & Wilmer L.L.P.

(57) ABSTRACT

Disclosed herein is a method for providing for erasure of data from, and/or diagnosis of at least one condition of a device. The method includes the steps of providing a stored set of actions, the actions directed to either or both of an erasure action and a diagnosis action; selecting actions from the stored set and linking the actions to generate a sequence of actions; and outputting, storing or performing the generated sequence of actions. Performing the sequence of actions may include performing at least one of the actions in dependence or based on data representative of a property of the device, at least one customer or client or business preference or requirement, or at least one regulatory requirement.

18 Claims, 18 Drawing Sheets

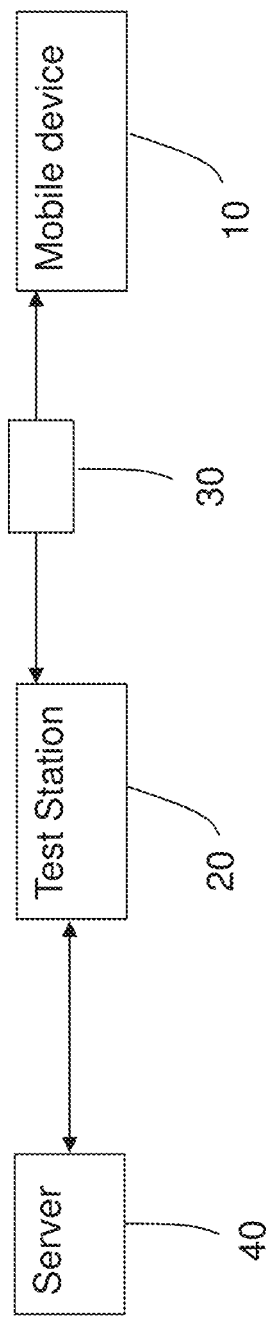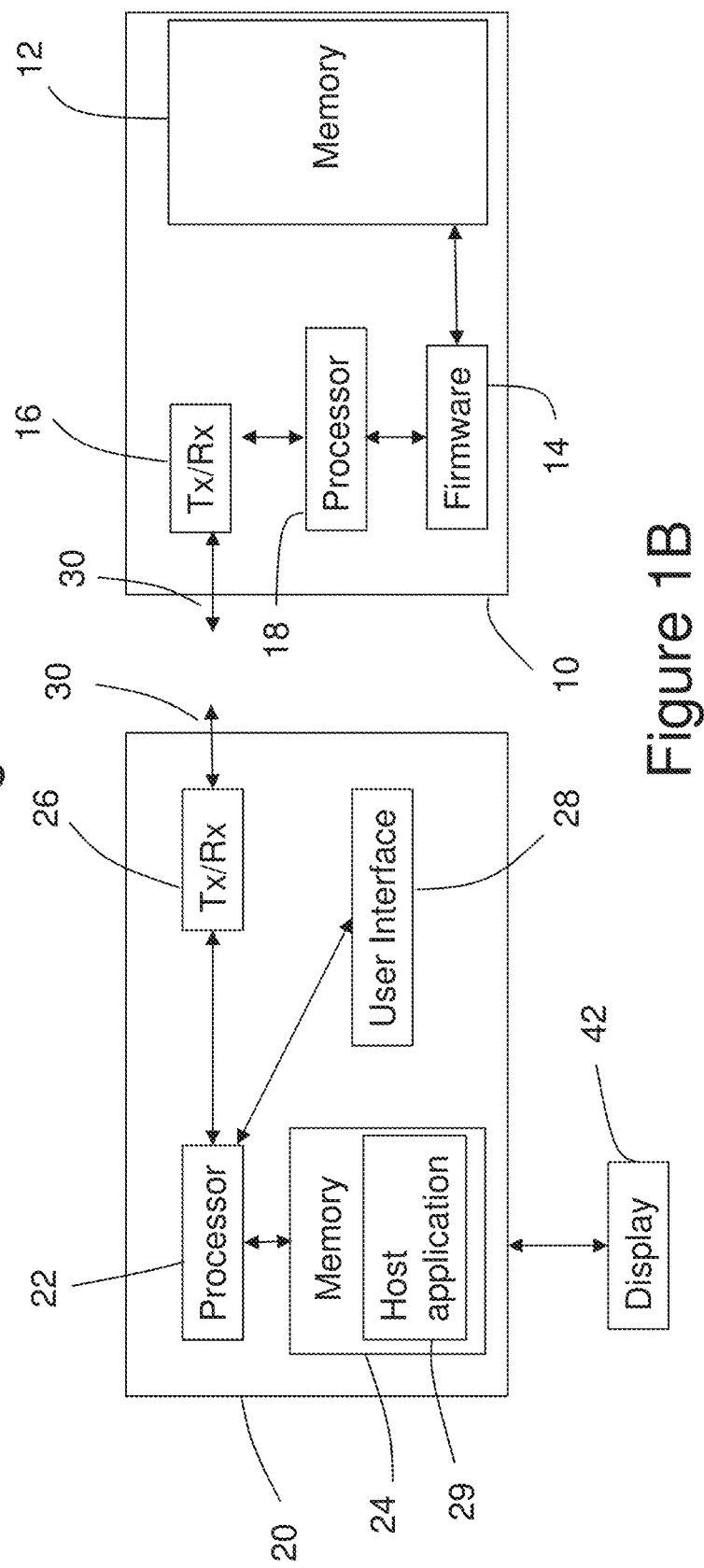
Figure 1A
Figure 1B

USER SELECTABLE ERASURE AND DIAGNOSTIC METHOD AND SYSTEM

PRIORITY CLAIM

This application claims the benefit of earlier filing date under 35 U.S.C. 119 to Application No. 1715407.1 filed in the United Kingdom Intellectual Property Office on Sep. 22, 2017.

FIELD

This application relates to systems and methods for erasure and/or diagnosis, for example erasure of data stored in electronic devices, and to systems and methods for providing workflows for performance of such methods.

BACKGROUND

A huge number of computing and data storage devices, for example mobile technologies such as smart phones and tablets, are used worldwide. Due to the large numbers of devices in use, the testing and conditioning of new and used mobile devices is a valuable service.

In some case, industrial processing plants, referred to as IT Asset Disposition (ITAD) services are used to facilitate the testing, disposal and/or redeployment of devices, often processing tens of thousands devices a week. In these situations the speed, efficiency and accuracy with which devices can be processed is paramount.

A vital part of the disposal or reconditioning of devices is the deletion of data, for example user data, to comply with customer or legal requirements, and to ensure that confidential or other sensitive data is not retained. The specification of an erasure process can depend on a range of factors, including device properties, customer and legal requirements.

The increased complexity of devices, and customer requirements, has led to a greatly increased number of options and possible process flows for testing and conditioning of a device, for example processes may combine both diagnostic and erasure processes.

Due to increased complexity and number of choices, a testing process can be more vulnerable to mistakes and inconsistencies, can require significant effort in setting up desired process flows, and can require greater operator input and training, and can lead to delays in processing. Process flows can be difficult to set up, visualise and implement as requirements become more complex and may require to be changed dependent on customer requirements or device properties.

SUMMARY

In a first aspect of the invention there is provided a system, for example for providing for erasure of data from, and/or diagnosis of at least one condition of, a device, the system comprising:
a stored set of actions;
  wherein the stored set of actions includes at least one of a) or b):
a) at least one erasure action that includes sending data and/or instructions to a storage device that includes a memory to delete or overwrite data stored in at least a region of the memory;
b) at least one diagnosis action to determine at least one property of the device.

The system may comprise a user interface to enable a user to select a plurality of actions from the stored set of actions, The user interface may be configured to enable the user to link the selected actions to produce a sequence of actions.

The system may comprise a processing resource configured to activate and/or output and/or store the linked set of actions, for example under command of the user, for example to produce an executable sequence of actions that is executable to perform a desired erasure procedure and/or a desired diagnostic procedure.

The system may comprise a stored at least one link, for example a set of links of different types. The link or at least one of the links may comprise or represent an instruction to proceed from one of the actions to another of the actions. At least one of the links may comprise or represent an instruction to proceed from one of the actions to another of the actions subject to at least one condition. The at least one condition may comprise or represent an operation, for example a logical operation, and/or be dependent on an output or outcome of the operation, for example a Boolean operation. The at least one operation may comprise at least one of an And, Or, If-Then, Nor, Xor, Nand or any other suitable operation.

The user interface may be configured to enable the user to select one or more links thereby to link the selected actions to produce the sequence of actions.

The user interface may be configured to display graphical representation(s) of the action(s) and/or the link(s). The user interface may comprise at least one window for display of the graphical representation(s) of the action(s) and/or the link(s). The user interface may be configured to insert and/or move at least some of the graphical representation(s) of the action(s) within said at least one window, and/or to move or insert the graphical representation(s) of the link(s) within said at least one window, for example based on user input. The user interface and processing resource may be responsive to the movement and/or insertion of the graphical representations, for example so as to form the linked sequence of actions.

The user input may comprise any suitable user input, for example at least one of drag-and-drop operation(s), mouse click(s), button press(es), point and click operation(s).

The producing of the executable sequence of actions may comprise storing and/or transmitting and/or otherwise outputting an executable program, and/or storing and/or transmitting and/or otherwise outputting a dataset (for example for use by a further executable program). The dataset may define execution and/or erasure and/or diagnosis options for use by the or a further executable program.

The transmitting of the executable program and/or dataset may comprise transmitting the executable program and/or dataset to a further apparatus, for example an operator terminal. The further apparatus may be connectable (e.g. via wired or wireless connection) to the device that is to be subject of the desired erasure procedure and/or the desired diagnostic procedure.

The further apparatus, for example the operator terminal, may be configured to execute the sequence of actions, for example on command of the or an operator, based on the executable program and/or dataset. The further apparatus may include erasure and/or diagnosis software and/or hardware that may be configured to perform the sequence of actions represented by the program and/or dataset.

The further apparatus may include an operator interface for displaying at least one property and/or result of the sequence of actions, for example before during or after performance of then sequence of actions. The sequence of actions may be an automatically performed sequence of actions, or a partially automatic sequence of actions, for example a sequence of actions that requires and/or prompts for operator input at at least one stage of the sequence of actions in order to complete the desired erasure procedure and/or the desired diagnostic procedure.

The operator interface and/or the further apparatus may be configured to enable selection of one or more of a plurality of sequences of actions, for example sequences of actions stored by or accessible to the system. At least one, optionally each, of said plurality of sequence of actions, may have been produced by the system using the processing resource, stored set of actions and user interface, for example under command of the user.

The selection of one or more of the plurality of sequences of actions may be performed in dependence on user input and/or operator input, and/or in dependence on at least one property of the device to be subject of the erasure and/or diagnosis procedure, and/or in dependence on at least one customer or client or business preference or requirement, and/or in dependence on at least one regulatory requirement.

The system may be configured to obtain data representative of said at least one property of the device to be subject of the erasure and/or diagnosis procedure, and/or said at least one customer or client or business preference or requirement, and/or said at least one regulatory requirement.

The system, for example the processing resource and/or the further apparatus and/or other component, may be configured to obtain said data representative of said at least one property of the device to be subject of the erasure and/or diagnosis procedure, and/or said at least one customer or client or business preference or requirement, and/or said at least one regulatory requirement from a source, for example a remote source, for example a server or database.

The system, may be configured to perform the sequence of actions, or the selected one of the sequences of actions using data representative of at least one property of the device to be subject of the erasure and/or diagnosis procedure, and/or at least one customer or client or business preference or requirement, and/or at least one regulatory requirement, as well as or instead of selecting amongst stored sequences of actions based upon such data.

In a further aspect, which may be provided independently, there is provided a system, for example for providing for erasure of data from, and/or diagnosis of at least one condition of, a device, the system comprising a processing resource configured to display and/or perform a sequence of actions, wherein the sequence of actions includes at least one of a) or b):
a) at least one erasure action that includes sending data and/or instructions to a storage device that includes a memory to delete or overwrite data stored in at least a region of the memory;
b) at least one diagnosis action to determine at least one property of the device, and optionally the processing resource is configured to perform, display or select at least one of the actions in dependence or based on data representative of:
at least one property of the device to be subject of the erasure and/or diagnosis procedure, and/or at least one customer or client or business preference or requirement, and/or at least one regulatory requirement.

The processing resource may be configured to obtain said data from a source, for example a remote source, for example a server or database, for example, a dynamically updated or updateable source. The processing resource may be configured to obtain said data before, during or upon initiation of said sequence of actions or periodically or in response to updating of the data by the source or in response to an update message from the source.

The erasure procedure may comprise any suitable erasure procedure, for example file overwriting or data overwriting procedure or a cryptographic erasure procedure. The erasure procedure may comprise changing or deleting at least one key and/or removing, overwriting data.

The erasure procedure may comprise performing the erasure procedure in respect of a selected at least one region of the memory. The selected at last one region may comprises a user storage region, for example a user partition.

The selected at least one region may comprise region(s) of the memory to which a user of the data storage apparatus may, for example has permissions to, write user-specified content, for example data, programs, images, documents. The selected at least one region may comprise substantially all region(s) of the memory to which a user may, for example has permissions to, write user-specified content, for example data, programs, images, documents. The selected at least one region may comprise memory that is not reserved for an operating system and/or firmware of the data storage apparatus. The selected at least one region may comprise substantially all of the memory which is not reserved for an operating system and/or firmware of the apparatus. The selected at least one region may comprise one or more, optionally all, regions whose stored content may change due to use of the device by a user.

The erasure procedure may comprise a verification procedure, for example to verify that files or other data have been written to the memory correctly for erasure purposes and/or to verify that substantially all of the selected at least one region of memory has been overwritten or otherwise erased and/or to verify that at least one key has been changed or deleted.

The diagnostic procedure may comprise any suitable diagnostic procedure, for example any suitable procedure to determine at least one of: whether a selected component of the device is present or absent, damaged or undamaged, functional or non-functional; whether at least one component or procedure of the device operates correctly; determination of performance level of at least one component of the device or whether at least one procedure to be performed by the device operates correctly.

The device may comprise at least one of a phone, a smartphone, a tablet, a laptop computer, a desktop computer, a portable electronic device, a music device and/or a video device, or any other suitable device. The device may comprise a portable or mobile device.

The device may comprise an iOS device or an Android device or a Windows device or a Blackberry device, or a device supporting any suitable operating system.

The memory may comprise any suitable memory, for example but not limited to at least one of a Self-encrypting Drive (SED), a Hard Disk Drive (HDD), a Solid State Drive (SSD), Non-Volatile Memory, flash memory, NAND flash memory, Random Access Memory (RAM), 3D Cross Point, ReRam, Phase Change Memory.

In a further aspect, which may be provided independently, there is provided a method for providing for erasure of data from, and/or diagnosis of at least one condition of, a device comprising providing a stored set of actions
wherein the stored set of actions includes at least one of
a) or b):

a) at least one erasure action that includes sending data and/or instructions to a storage device that includes a memory to delete or overwrite data stored in at least a region of the memory;
b) at least one diagnosis action to determine at least one property of the device.

The method may comprise providing a user interface to enable a user to select a plurality of actions from the stored set of actions. The user interface may be configured to enable the user to link the selected actions to produce a sequence of actions.

The method may comprise activating and/or outputting and/or storing the linked set of actions, for example under command of the user, for example to produce an executable sequence of actions that is executable to perform a desired erasure procedure and/or a desired diagnostic procedure.

In a further aspect, which may be provided independently, there is provided a method of generating a sequence of actions comprising selecting actions from a stored set of actions and linking the action to generate the sequence of actions. The method may comprise activating and/or outputting and/or storing the linked set of actions, for example under command of the user, for example to produce an executable sequence of actions that is executable to perform a desired erasure procedure and/or a desired diagnostic procedure.

The stored set of actions may include at least one of a) or b): at least one erasure action that includes sending data and/or instructions to a storage device that includes a memory to delete or overwrite data stored in at least a region of the memory; at least one diagnosis action to determine at least one property of the device.

In a further aspect, which may be provided independently, there is provided a method for providing for erasure of data from, and/or diagnosis of at least one condition of, a device comprising performing a sequence of actions, wherein the sequence of actions includes at least one of a) or b):
a) at least one erasure action that includes sending data and/or instructions to a storage device that includes a memory to delete or overwrite data stored in at least a region of the memory;
b) at least one diagnosis action to determine at least one property of the device, and the method comprises performing at least one of the actions in dependence or based on data representative of:
at least one property of the device subject of the erasure and/or diagnosis procedure, and/or at least one customer or client or business preference or requirement, and/or at least one regulatory requirement.

The method may comprise obtaining said data from a source, for example a remote source, for example a server or database, for example a dynamically updated or updateable source. The processing resource may be configured to obtain said data before, during or upon initiation of said sequence of actions or periodically or in response to updating of the data by the source or in response to an update message from the source.

In further aspect(s) there is provided a computer program product comprising computer executable instructions for performing a method(s) according to any of the other aspect(s).

Features in one aspect may be applied as features in another aspect in any appropriate combination. For example, system or apparatus features may be applied as method features and vice versa.

BRIEF DESCRIPTION OF THE DRAWINGS

Various aspects of the invention will now be described by way of example only, and with reference to the accompanying drawings, of which:

FIG. 1A is a schematic diagram of a test station in communication with a data storage device;

FIG. 1B is a schematic diagram of the test station in communication with the data storage device;

DETAILED DESCRIPTION OF THE DRAWINGS

Figure 2:
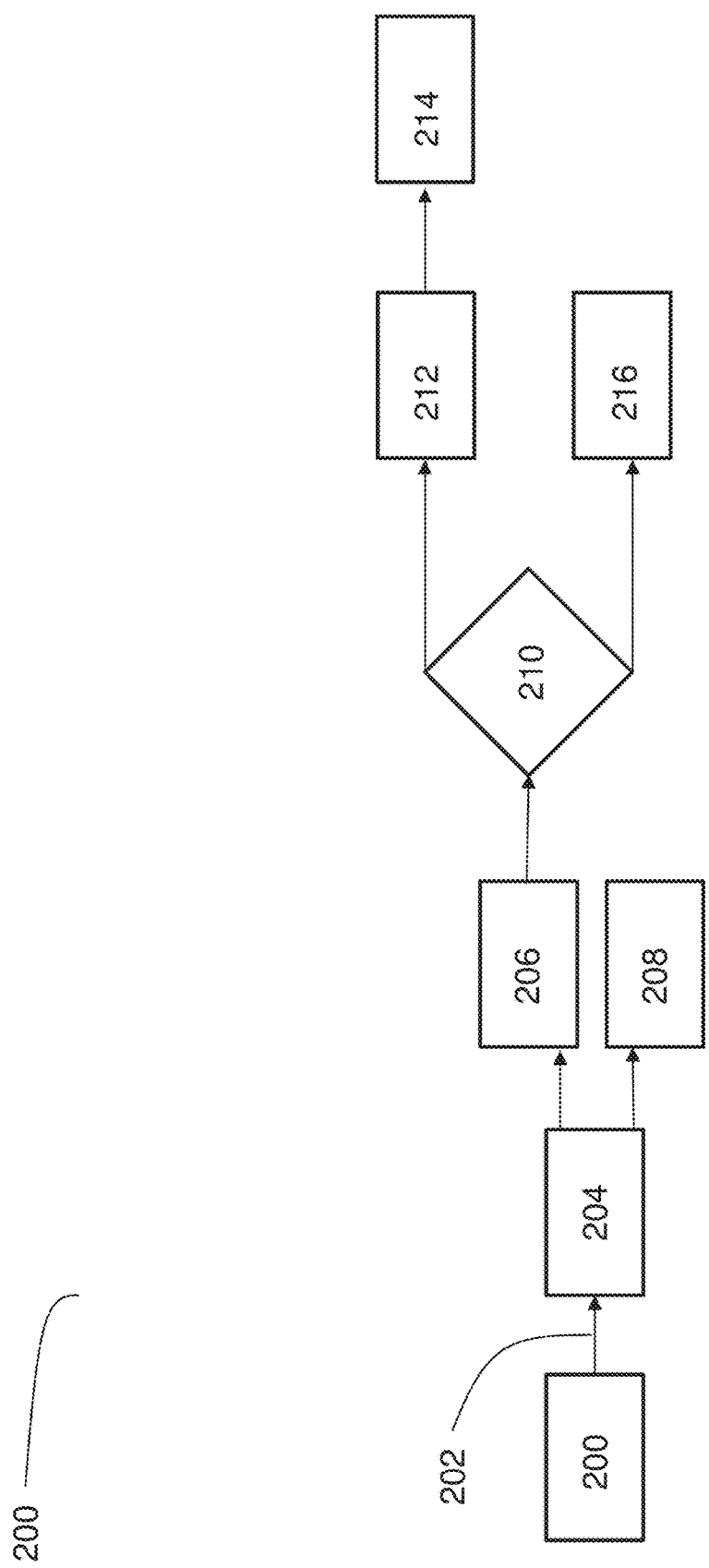
FIG. 2 is a illustrative example of a workflow.

Certain embodiments can be used in relation to testing and/or reconditioning and/or performing diagnostics on and/or erasing data from a device, and/or for creating, amending, visualising and/or implementing workflows for such testing, reconditioning, diagnostics or erasing.

Referring initially to FIG. 1A, there is shown a device 10, for example a mobile phone, to be tested in a testing or reconditioning facility, a test station 20 and a server 40 associated with the test station 20. The device may be, for example, a mobile smartphone or a tablet, or any other suitable device. The test station 20 may be any suitable computer resource, for example, a personal computer or workstation. The test station 20 is configured to be used by an operator. The server 40 has a memory resource configured store workflow data and to provide workflow data to the test station 20. In some embodiments, a plurality of test stations are in communication with the server and the server is configured to provide workflow data to the plurality of test stations.

The device 10 and the test station 20 are configured for the transfer of data therebetween via an interface 30, for example, in accordance with a file-based transfer protocol. In some embodiments, the file-based transfer protocol operates at a logical file level and may be, for example, a media transfer protocol (MTP), a picture transfer protocol (PTP), Apple File Conduit (AFC) and USB mass storage. The file-based transfer protocol that is used may be dependent on the particular device 10 or type of device.

The device 10 and test station 20 is shown in more detail in FIG. 1B. Whilst the test station 20 is represented as a single apparatus, it should be understood that the test station 20 may, in reality, include a plurality of distributed separate devices which may collectively perform the function of the test station 20 as described below. Also, the test station 20 may be located adjacent to the device 10 or may be located remotely from the device 10.

As shown in FIG. 1B, the device 10 includes memory 12 for data storage, software, for example firmware 14, for performing data storage and data erasure operations, a transmitter/receiver 16 for communicating with the test station 20 via the interface 30 and a processor 18. Although not shown in FIG. 1B, it should be understood that the device 10 may include data compression functionality for compressing data to be written to the memory 12 or for decompressing data read from the memory 12. Similarly, although not shown in FIG. 1B, it should be understood that the device 10 may include wear-levelling functionality for distributing data to different physical memory addresses at different times to thereby extend the lifetime of the memory 12. The memory 12 of the device 10 may include or may be at least one of a Self-encrypting Drive (SED), a Hard Disk Drive (HDD), a Solid State Drive (SSD), Non-Volatile Memory, flash memory, NAND flash memory and Random Access Memory (RAM). In some embodiments, the memory 12 may be removable from the device or a removable memory may be provided in addition to memory 12.

The device 10 may include further components, not shown in FIG. 1B. Such further components may comprise, for example, one or more of: a camera or other image capturing device, a wireless connectivity module, for example WiFi and/or Bluetooth, a battery or energy resource, a display, a user interface, for example a touch-screen display, further sensor components including accelerometer, gyroscope, digital compass, ambient light sensor, proximity sensor, magnetometer, location device, for example a global positioning sensor, radio receiver, heartrate monitor, fingerprint sensor, USB compatible connector, audio connector.

The interface 30 may operate according to, or may be compliant with, an interface standard, for example at least one of Serial AT Attachment (SATA), Parallel ATA (PATA), Small Computer System Interface (SCSI), Serial Attached SCSI (SAS), Universal Serial Bus (USB), Peripheral Component Interconnect Express (PCI Express or PCIe), Non-Volatile Memory Express (NVM Express or NVMe), Universal Flash Storage (UFS), MultiMediaCard (MMC) and MMC variants including RS-MMC, MD-MMC, DV-MMC, MMCplus, MMCmobile, SecureMMC, eMMC, and Secure Digital and Secure Digital variants including SDIO, SD, miniSD, microSD.

As shown in more detail in FIG. 1B, the test station 20 includes a processor 22, a memory 24, a transmitter/receiver 26 and a user interface 28. The test station 20 may include or may be at least one of a server, a computer, and a laptop. A host application 29 comprising computer-executable instructions is stored in the memory 24 which, when executed by the processor 22, cause the test station 20 to retrieve workflow or action data from the server 40 and perform actions represented by the workflow or action data, for example, by the workflow illustrated in FIG. 2.

To provide erasure of data from and/or diagnosis of at least one condition of a device, a set of actions are stored on the server 40 and retrievable by the test station 20. The set of actions are presented to an operator of the test station 20. The set of actions may include actions to be carried out by an operator or by a further remote system. The set of actions may be linked together to produce a sequence.

In use, host application 29 is executed by processor 22. Using input via the user interface 28 and display 42, the host application 29 allows a user to retrieve a workflow from server 40. The workflow is presented on display 42 to a user.

In some embodiments, a user executes the set of actions presented to them by the workflow to perform the desired diagnosis or erasure procedure. In some embodiments, the user may interact with the workflow presented to them, by inputting additional information, for example, in response to queries or conditional statements of the workflow. In some embodiments, some actions involve additional information being provided to the workflow by the device 10 itself, or by a further computing device.

As described above, the set of actions are presented on display 42 of the test station 20 as a graphical representation. The graphical representation is hereby referred to as a workflow and an illustrative example is shown in FIG. 2. The user can follow the workflow to perform a testing and/or erasure and/or diagnosis process on the mobile device 10.

The workflow represents a set of actions. Each action is graphically represented in the workflow by a workflow element. Workflow elements representing consecutive tasks or actions are joined together by connectors. A linked sequence of actions is therefore represented by a workflow including workflow elements and connectors.

A workflow element can be one of: a start element, an action element, a conditional element and a terminating element. Using the display 42 and user interface 28 of the test station 20, or a display and user interface of another computer, workflows can be created and modified in accordance with user preferences.

A user can build up a workflow using these workflow elements, in accordance with a set of preferences.

Each workflow can be made up of one or more workflow paths that include actions between a start element and one or more terminating elements. Each workflow path has a start element and a terminating element.

In some embodiments, the remote server 40 stores a plurality of workflows and is configured to provide a workflow to the test station 20. As soon as a device 10 is connected, the test station 20 transmits device information to the remote server 40. Based on the received information a whole workflow is sent over back to the test station 20, for example to the host application 29. The remote server 40 can therefore select between different workflows on the server. The selection can be based on device attributes, for example, the kind of device, the operating system, or user credentials or previous owner attributes.

FIG. 2 shows a graphical representation of a workflow 200 that illustrates different types of workflow elements. The workflow 200 is made up of workflow elements (204, 206, 208, 210, 212, 214, 216) joined together by connectors, for example connector 202. Workflow 200 has a start element 204, a first terminating element 208, a second terminating element 214 and a third terminating element 216. Workflow 200 has a first action element 204, a second action element 206 and a third action element 212. Workflow 200 has a conditional element 210. The workflow elements can be considered to be or represent actions. The connectors can be considered to be or represent links.

The start element 200 is the start of the workflow 200. In some embodiments, the start element 200 corresponds to an initial action, for example, an instruction to connect a device to be tested to the test station.

Workflow 200 has a first workflow path connecting the start element 200 and the first termination element 208, a second workflow path connecting the start element 200 and the second termination element 214 and a third workflow element connecting the start element 200 and the third termination element 216.

An action element represents an action or task to be completed by an operator or a further device. Action elements can represent the following action types: data erasure, a diagnosis step, printing, generating and/or sending diagnostic reports, installation of application on device, operating system activation, configuration of connectivity, location check, security check, lost/stolen/blocked check, sending a message to the remote server.

Depending on the type the action represented, an action element may have more than one output correspond to the more than one outcomes of the represented action. First action element 204 is an example a multiple output, in this case two outputs, action element. In contrast, second action element 206 and third action element 212 have only one output.

Workflow elements may represent an action that requires dynamic input or requires a connection to a remote system. The remote system may be an asset management system or any kind of business intelligence system. For example, if a workflow element present a question to an operator question that requires an answer, for example, "Is screen broken?", the workflow can ask the remote system what to do next. The remote system can then check the value of the device and based on that check inform the operator if the device should be discarded or not.

By providing dynamic input to the system the number of decisions an operator must make is reduced and the operator can rely on the automatic system. This may result in a minimization of human error and mistakes and less to teach new operators.

A user can base workflow direction on action or workflow element output, questions to operator or values gathered from the device under test, for example, serial number, model type operating system.

Action elements may have more than one input and more than one output. For example, the output of an action may be a pass or a fail or other representation of possible outcomes of the represented action.

An action element having more than one input may join more than one workflow paths into a single workflow. An action element having more than one output on a workflow path splits the workflow path into more than one workflow paths. As shown in FIG. 2, a first outcome of the first action element 204 directs the workflow direction to element 206 (the second and third workflow paths) and a second outcome of action element 204 directs the workflow direction to element 208 (the third workflow path).

Workflow 200 also shows another type of workflow element: a conditional element 210. A conditional element represents a conditional or query to be presented to an operator. The next workflow element or action to be undertaken depends on the answer to the query. In some embodiments, as part of the condition or query action, a request for information is sent to the device 10 being tested or to another device, and the query or condition is answered based on at least the information received.

A conditional element can have two or more outcomes depending on the results of the condition or query represented. A conditional element on a workflow path splits the workflow path into more than one workflow path. In FIG. 2, a first outcome of conditional element 210 directs the workflow to element 212 (second workflow path) and a second outcome of conditional element 210 directs the workflow to element 216 (third workflow path).

As described above, workflow 200 has three workflow paths. First workflow path has the following workflow elements in the following order: start element 200, first action element 204 and first terminating element 208. Second workflow path has the following workflow elements in the following order: start element 200, first action element 204, second action element 206, conditional element 210, third action element 212 and second terminating element 214. Third workflow path has the following workflow elements in the following order: start element 200, first action element 204, second action element 206, conditional element 210, third terminating element 216.

Figure 3:
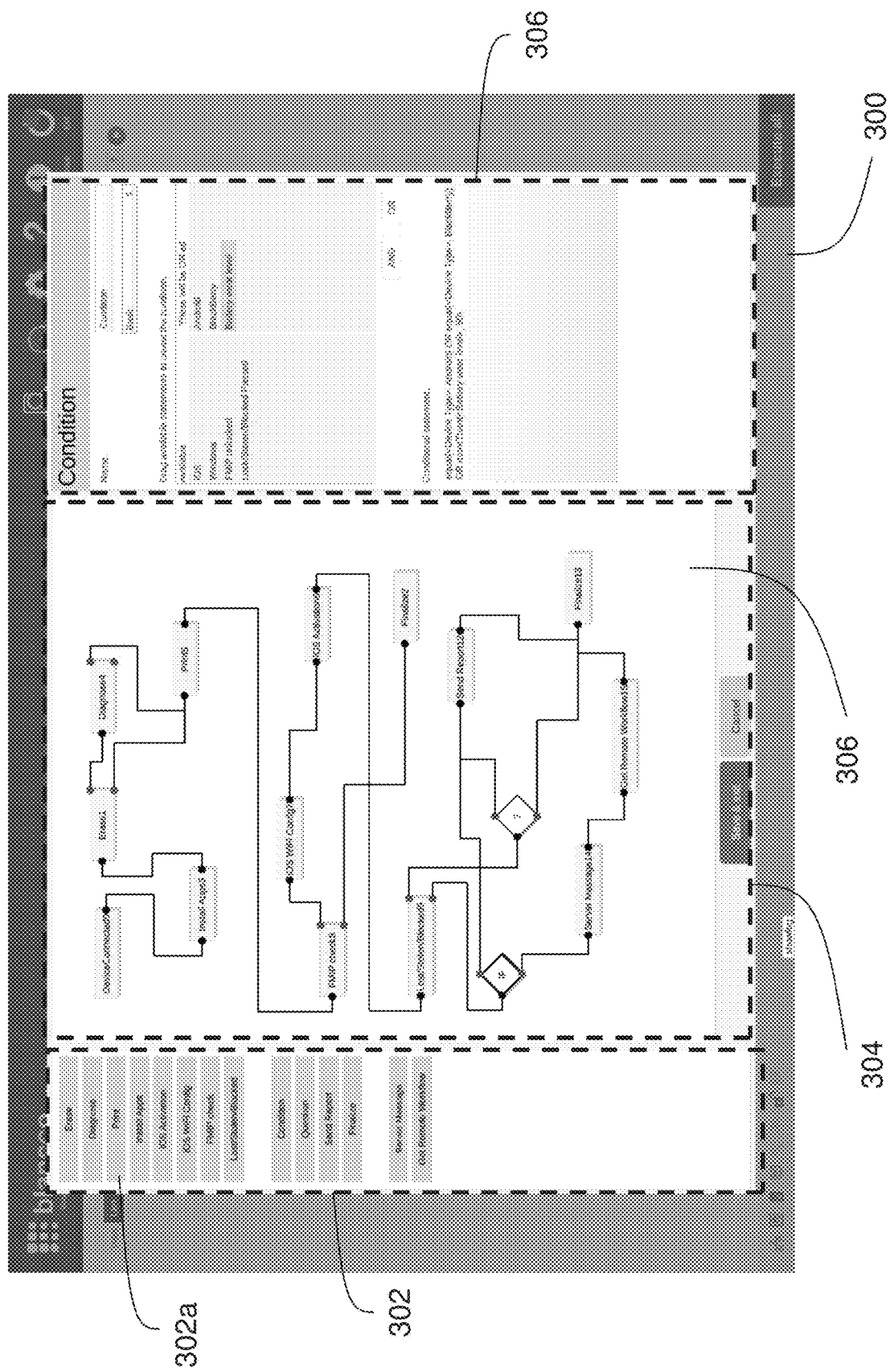
FIG. 3 shows a user interface for a user.

FIG. 3 shows a graphical user interface 300 for a user to create or modify a workflow. In some embodiments, the graphical user interface is displayed on the display 42 of the test station. In other embodiments the graphical representation is displayed on a display connected to server 40. In other embodiments, the graphical representation is displayed on a further display.

The graphical representation 300 has three windows or panels: an workflow element panel 302, a workflow panel 304 and an item information panel 304. The workflow element panel contains a number of workflow element icons representing different actions. An example of a workflow element icon is labelled 302a. The workflow element icons 302 correspond to different workflow elements that can be included into a workflow in the workflow panel 304. In some embodiments, one or more of the workflow element icons 302 of the workflow element panel represent classes or generic workflow element types. The workflow elements may be further configurable. Each workflow element icon 302 is selectable by a user.

The workflow panel 304 shows a workflow 306. The workflow 306 is editable by a user. The workflow 306 is made up of instances of the workflow elements selected from the workflow element panel 302. The workflow panel 304 allows a user to draw connectors between workflow elements, thus ordering a sequence of actions to be performed.

The item information panel 306 allows a user to enter and obtain information about a selected workflow element of the workflow 306. The information panel allows a user to tailor the selected workflow element by editing, adding or deleting information about the workflow element.

To create a workflow, a user selects a workflow element icon from the action panel 302 and places the selected item into the workflow panel. This creates an instance of the workflow element to be used as part of workflow 306. A user can drag and drop action icons from the action panel 302 into the workflow panel. The user can then connect workflow elements together using connectors. Each workflow element of the workflow 306 can be selected by a user, and information is input by the user via the item information panel.

Following the creation of a workflow, the workflow is stored on a central computer or the server 40. An operator at a test station can download the workflow to their test station and the user follow the workflow to test or re-condition the device 10. By providing an editable workflow, workflows can be freely designed, stored and re-used.

Interactive button elements are displayed on the workflow windows. These elements allow a user to save and/or exit or cancel changes to the current workflow.

In some embodiments, the workflow is provided to a remote system that is configured at least one of automatically make decisions in the workflow based on information provided to the remote system, for example, from an external source or from the mobile device 10. In some embodiments, the process is carried out by a remote device and may be completely automated.

Tests may be automatically ordered or suggestions as to a preferred ordering may be presented to a user. For example, ordering may be based on time taken for a specific action.

As an example, a customer may design a workflow that commences with an initial action. As a non-limiting example, an initial action could include 3 diagnostic tests to test if the device works as it should. Based on the outcome of these tests, a next step in the workflow is to erase data stored on the device and continue to do more tests. A user can build many different roads or workflow paths and theoretically infinitely large workflows. This provides a user the possibility to use the software exactly according to their desired process.

FIGS. 4 to 16 show example screenshots of the graphical representation.

Figure 4:
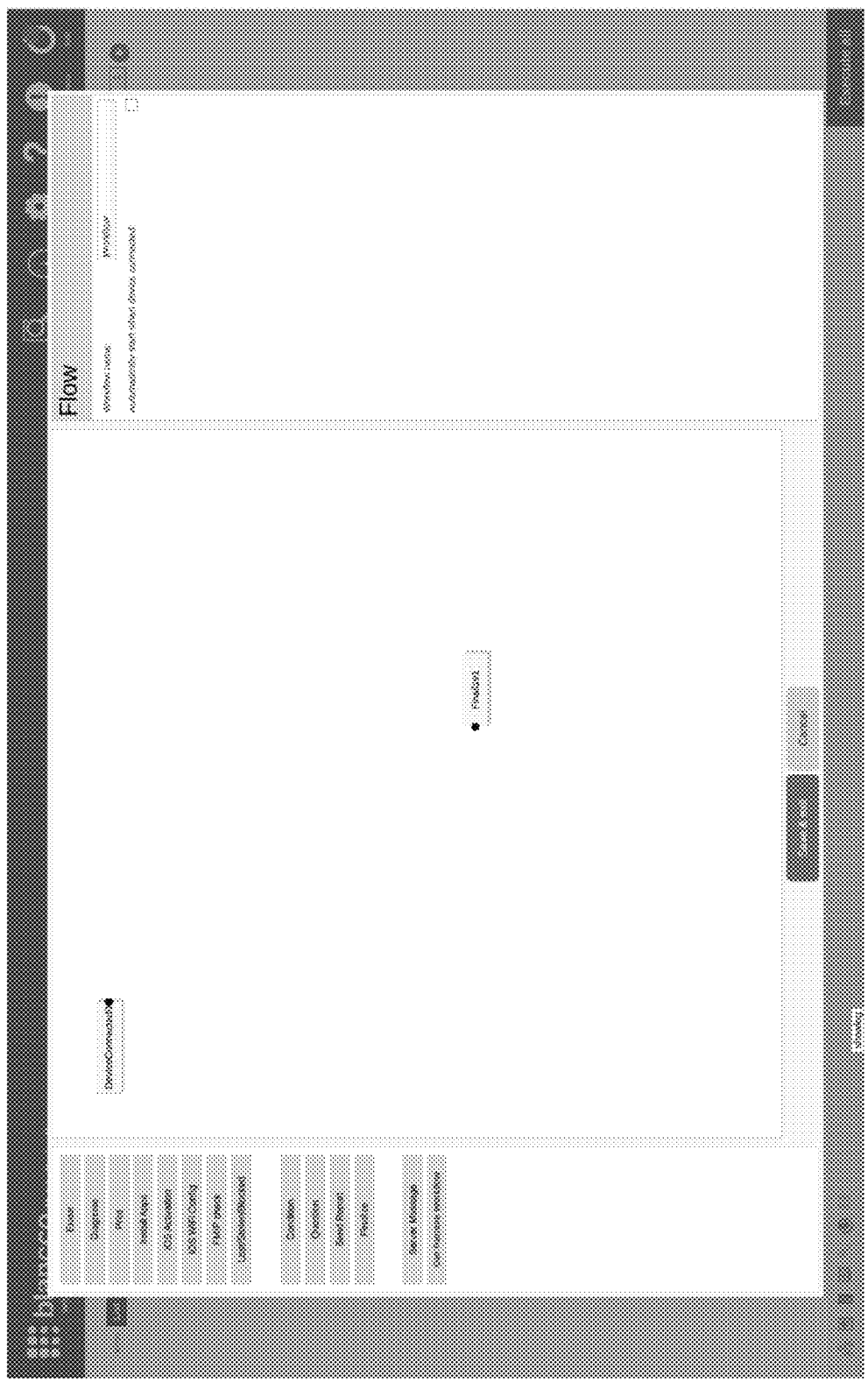
FIGS. 4 to 18 are further screenshots representing user interfaces.
Figure 5:
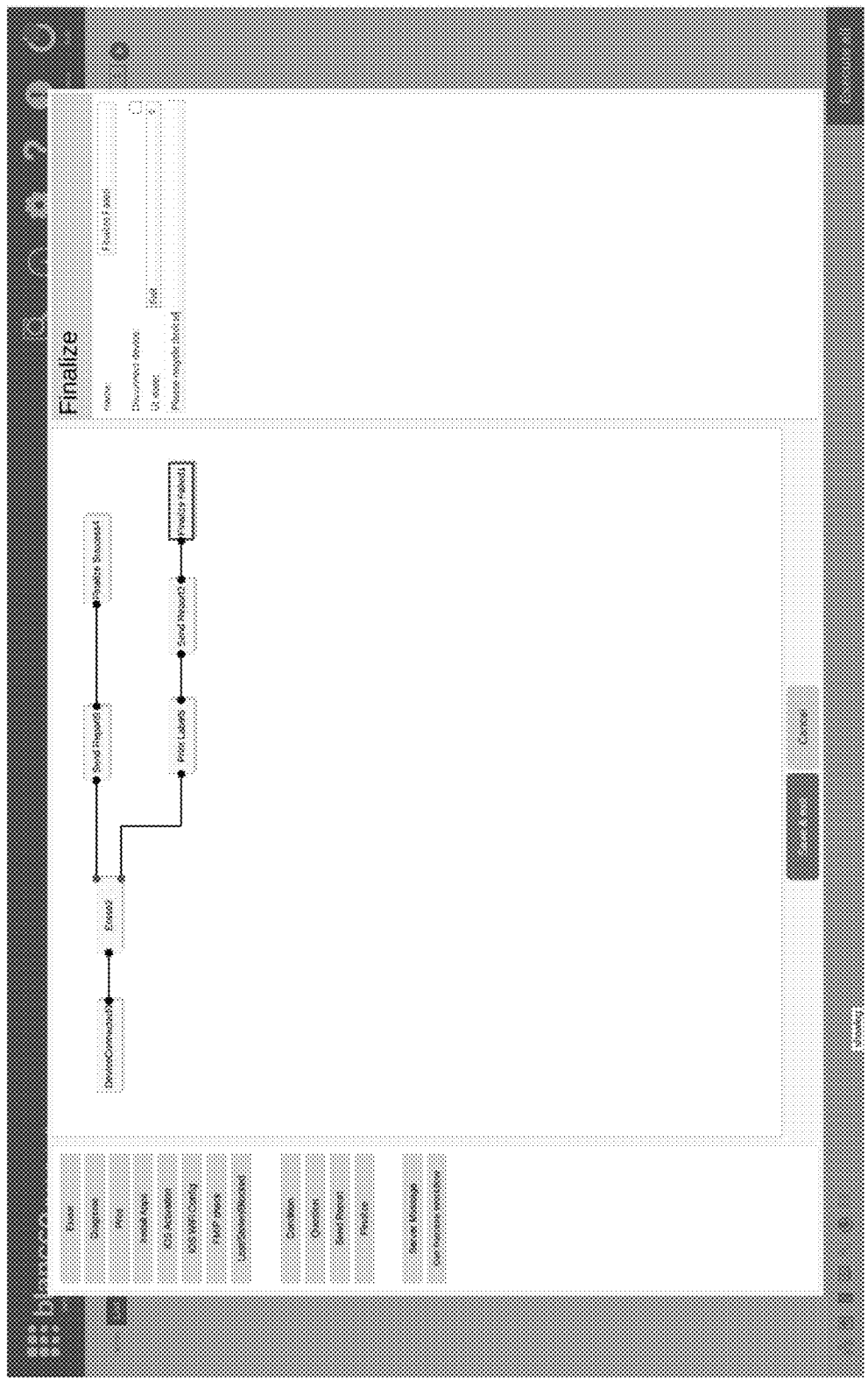

FIG. 4 shows a start element and an terminating element on a workflow. The two elements are not yet connected.

Figure 6:
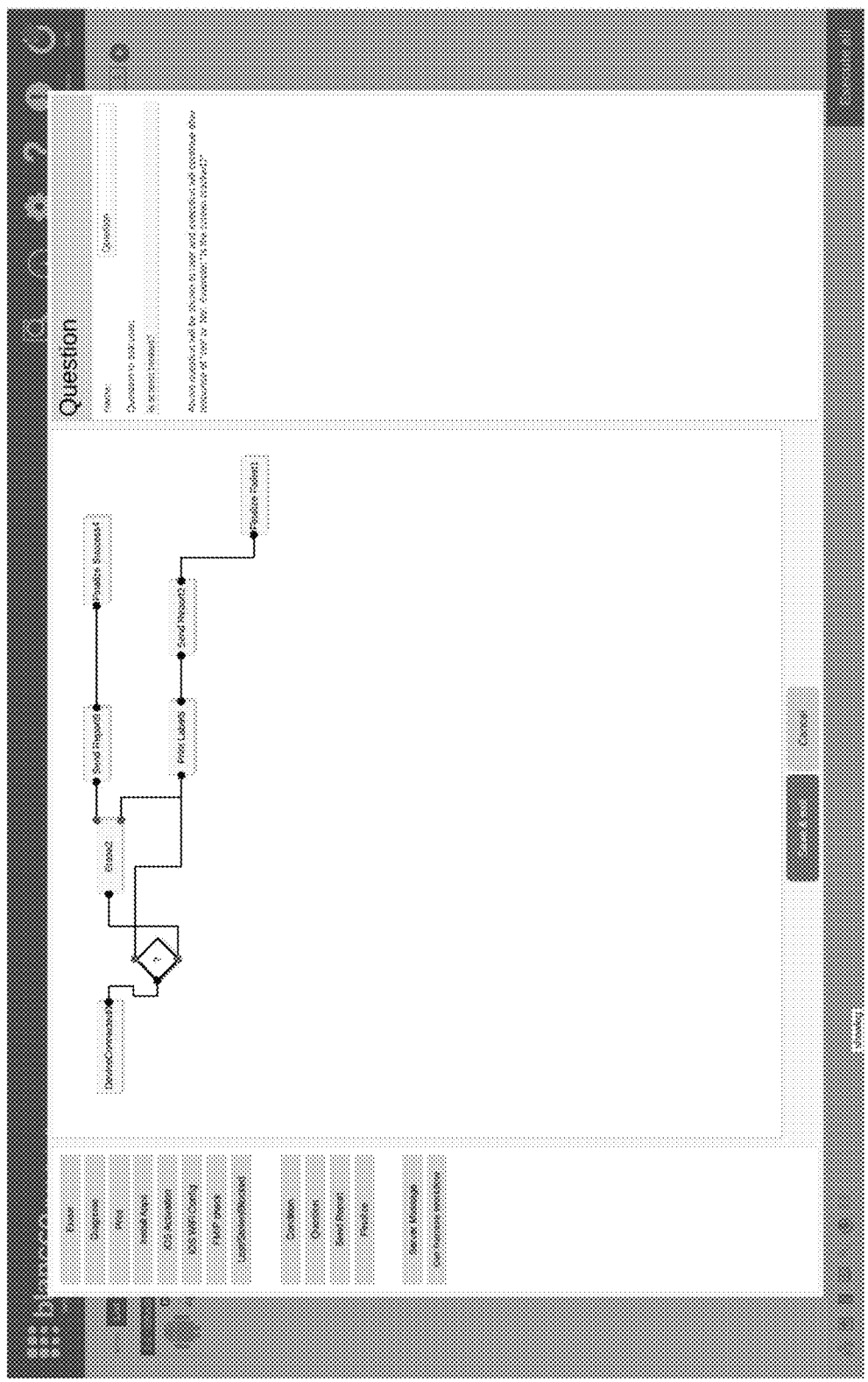

FIG. 6 shows an example of a conditional element, in particular, a question corresponding to "is screen broken". The question is editable in the information panel on the right hand side. If screen is broken, the workflow path followed is a failure path resulting in printing label, sending a failure report and finalize the failure path. If the screen is not broken, further actions are completed, including a data erasure process and report generation and sending.

Figure 7:
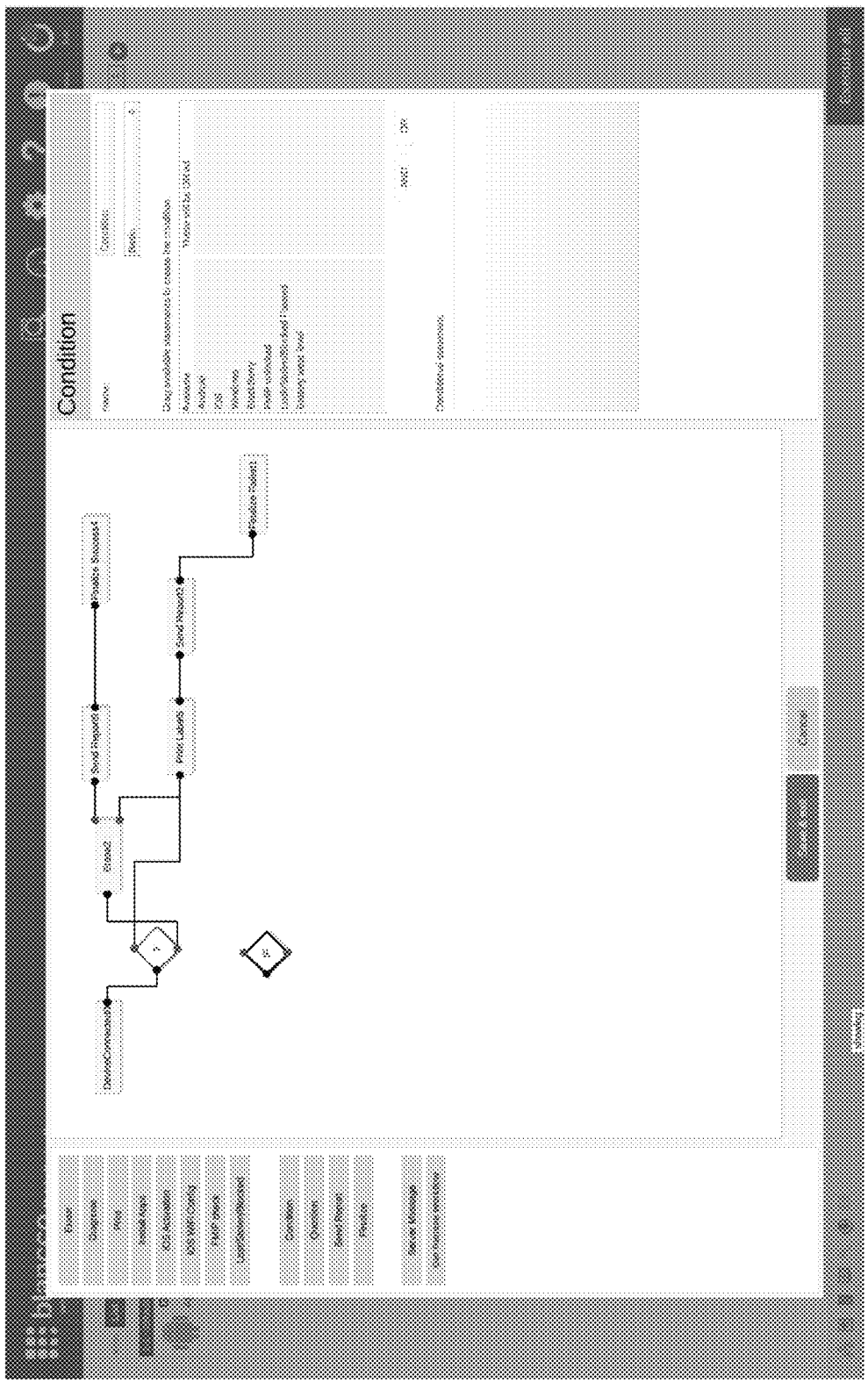
Figure 8:
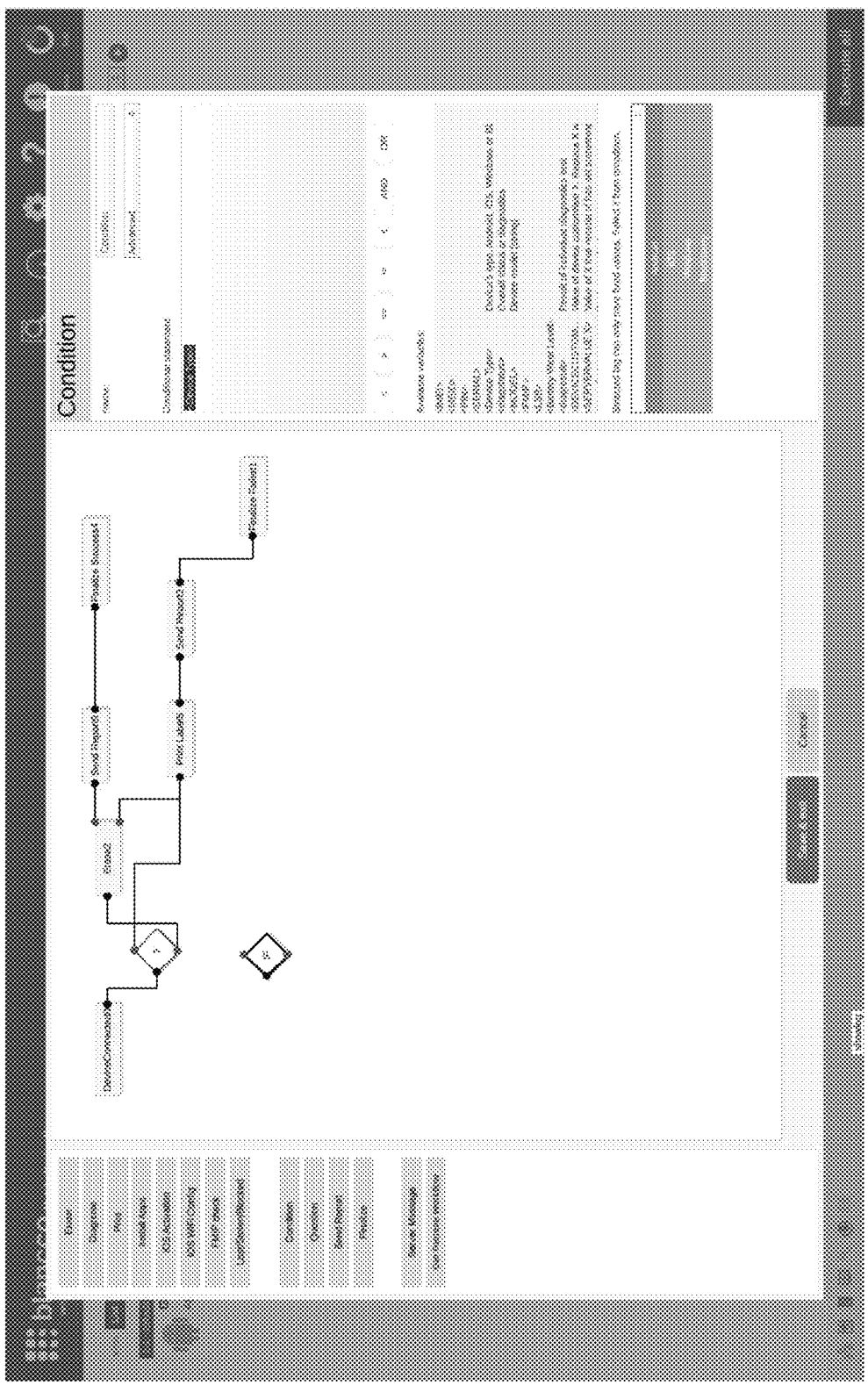
Figure 9:
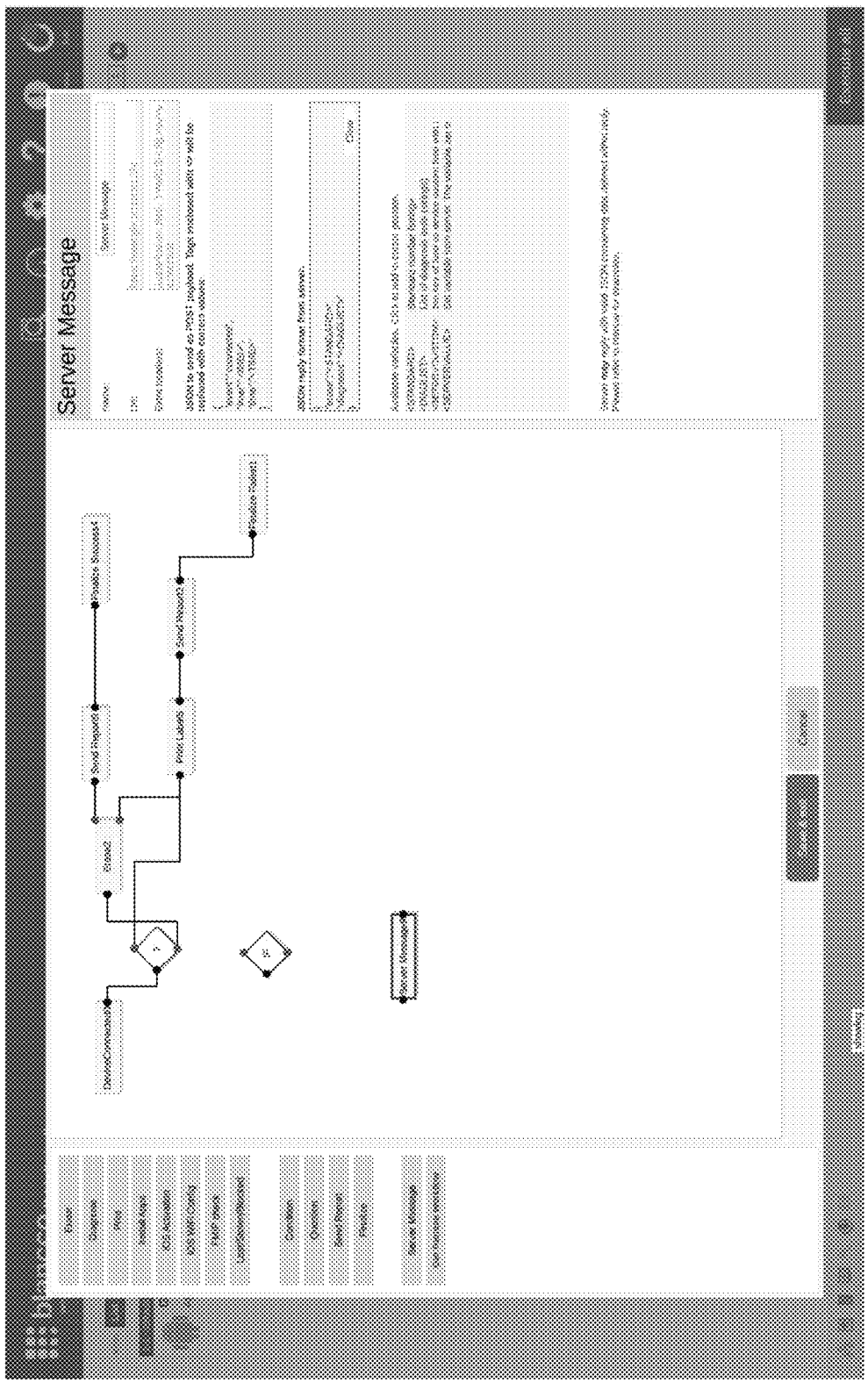
Figure 10:
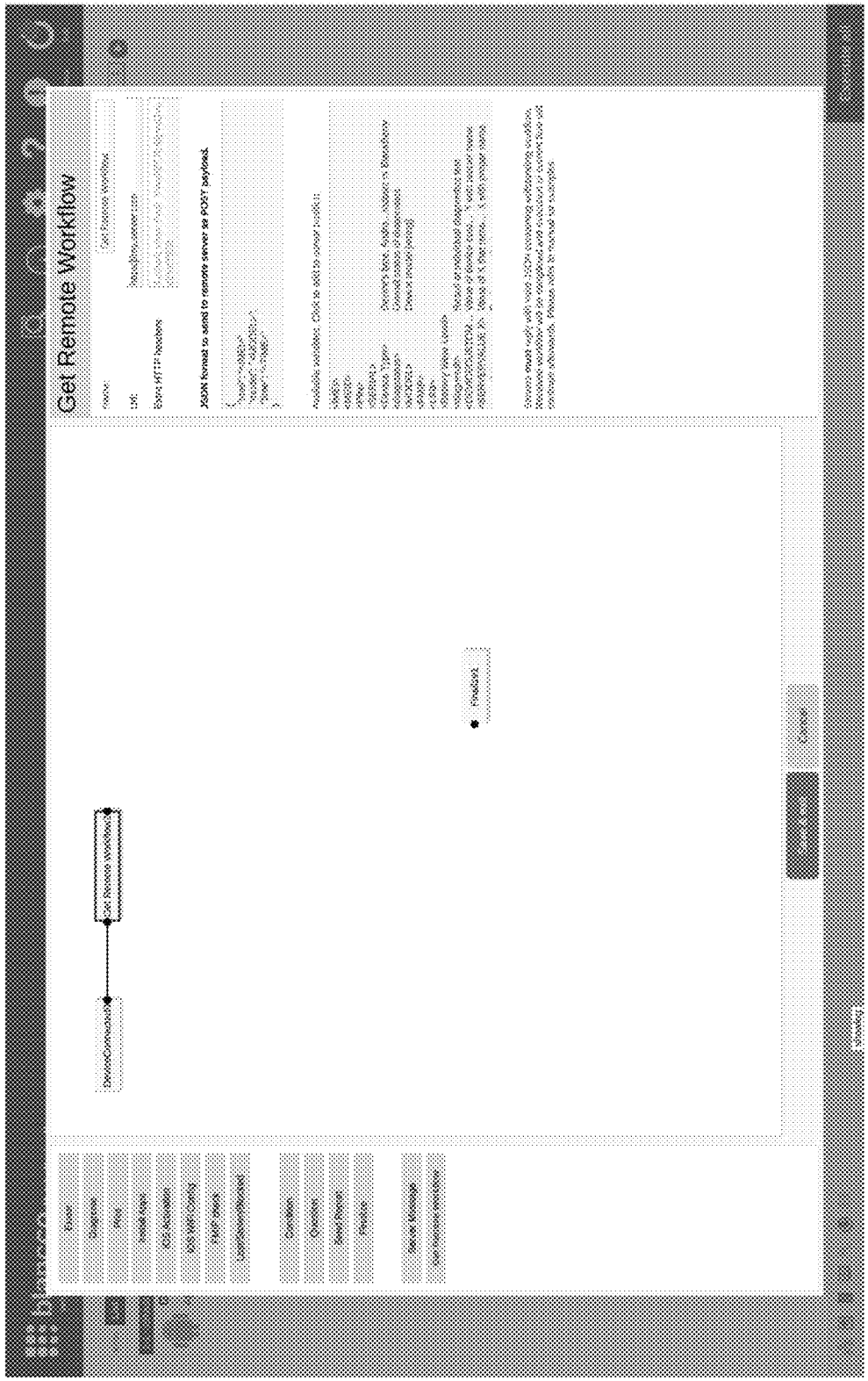
Figure 11:
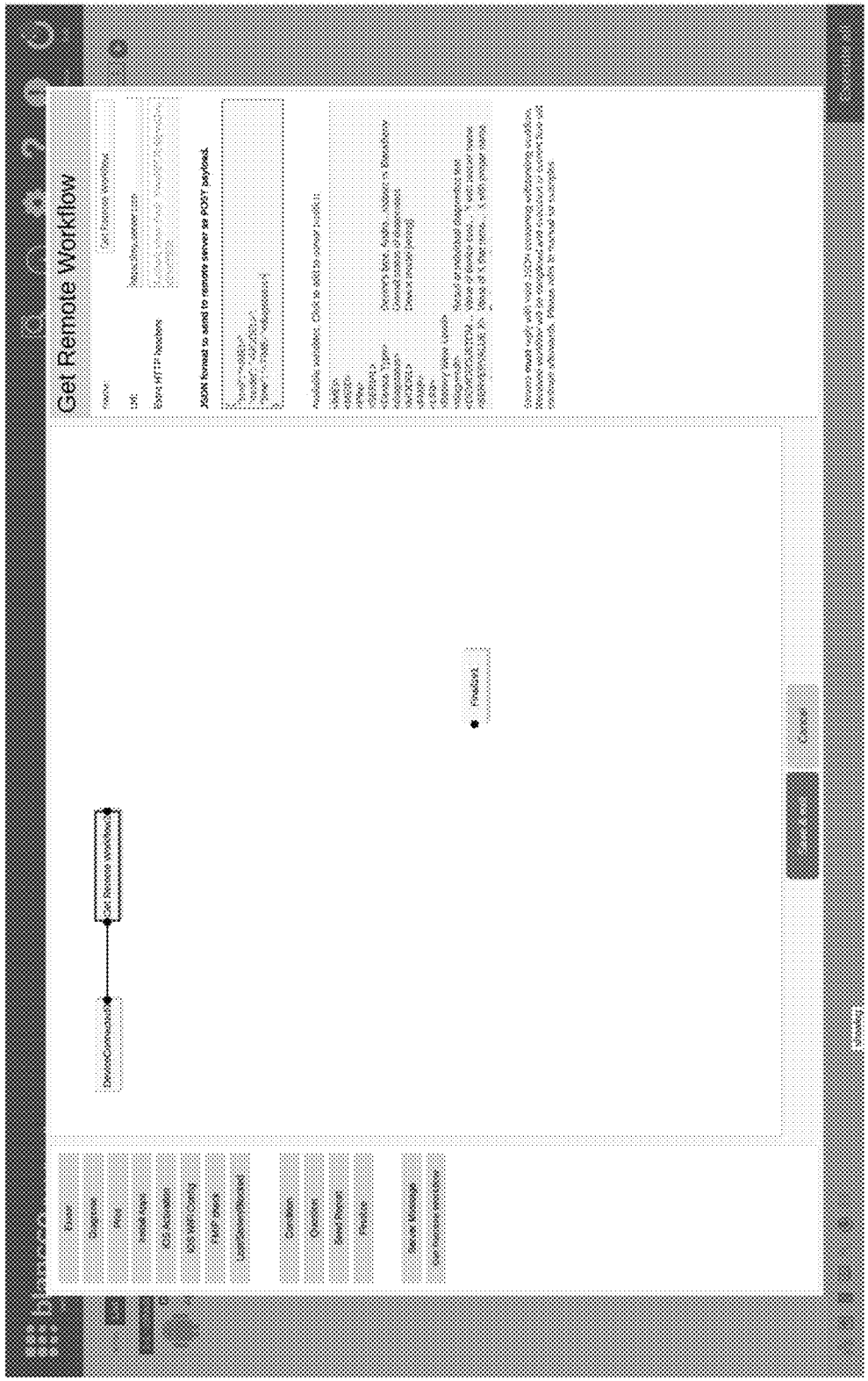
Figure 12:
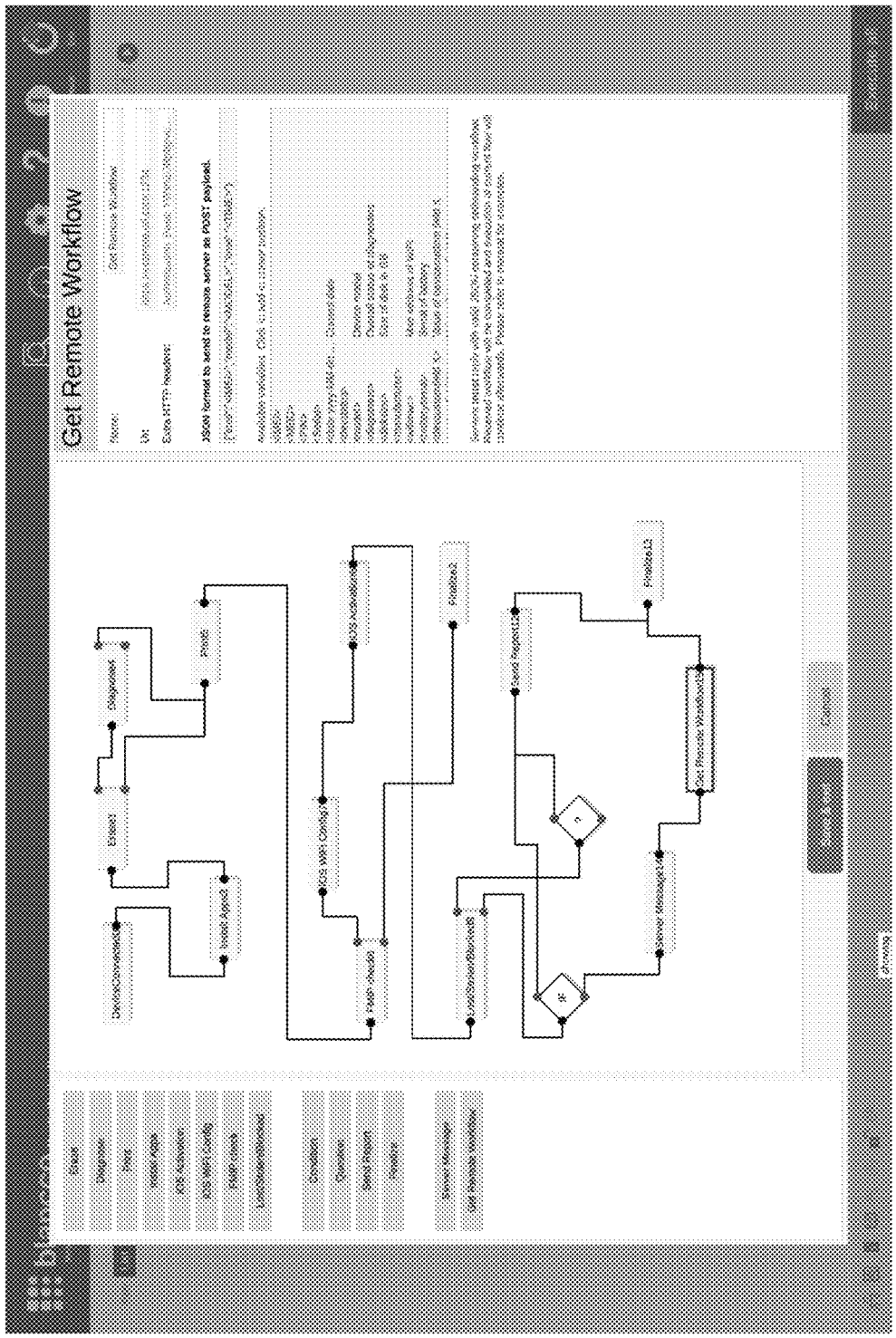
Figure 13:
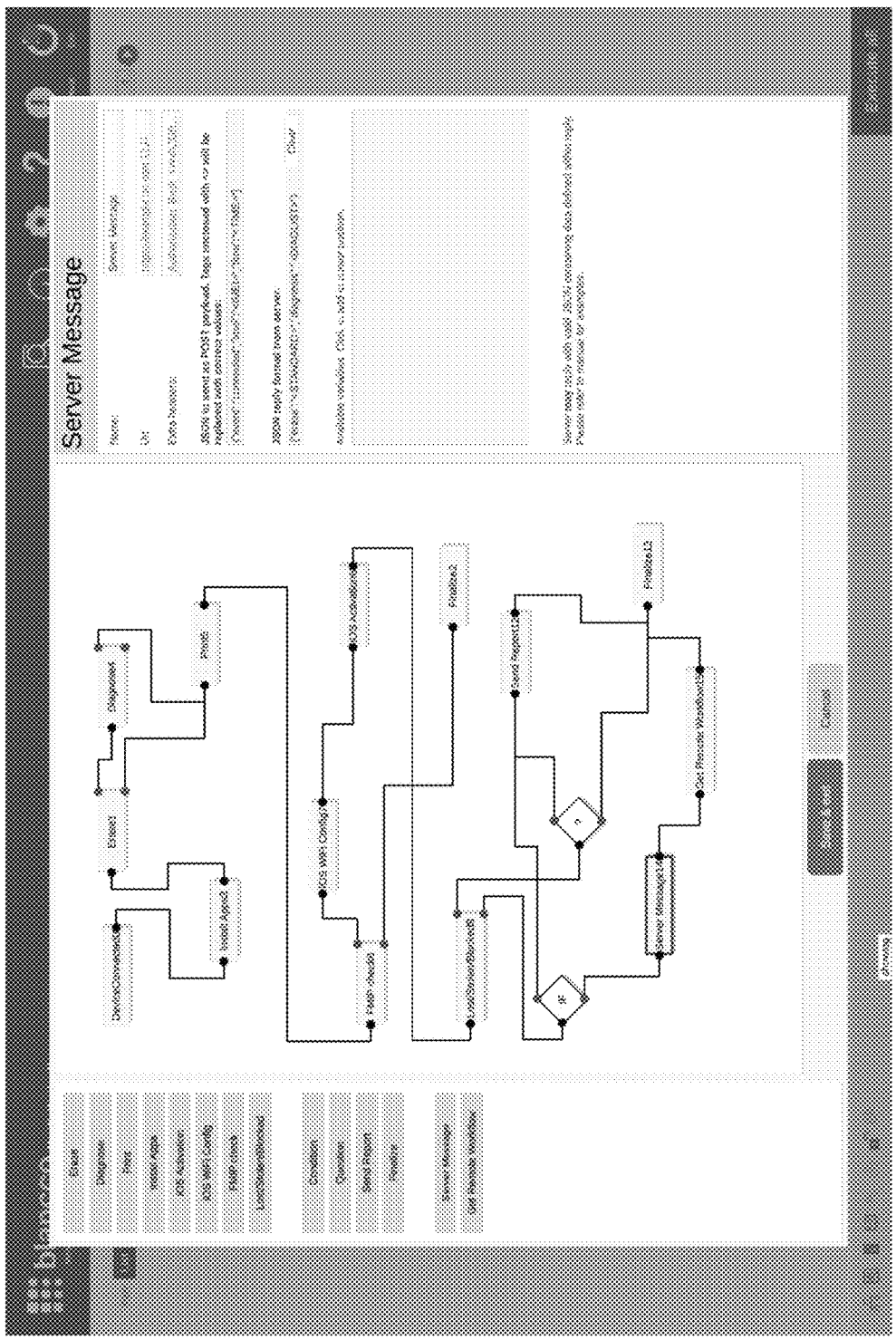
Figure 14:
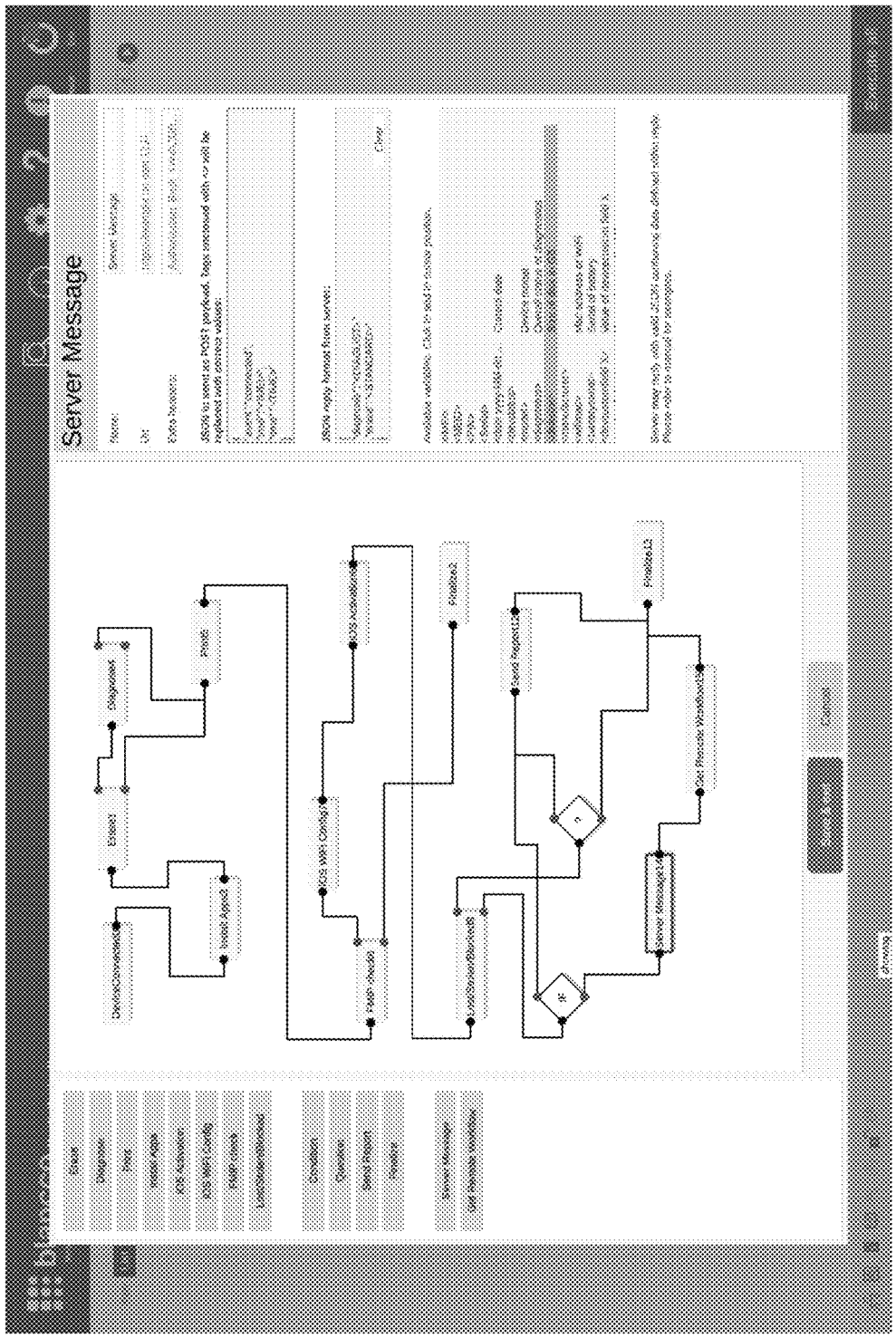
Figure 15:
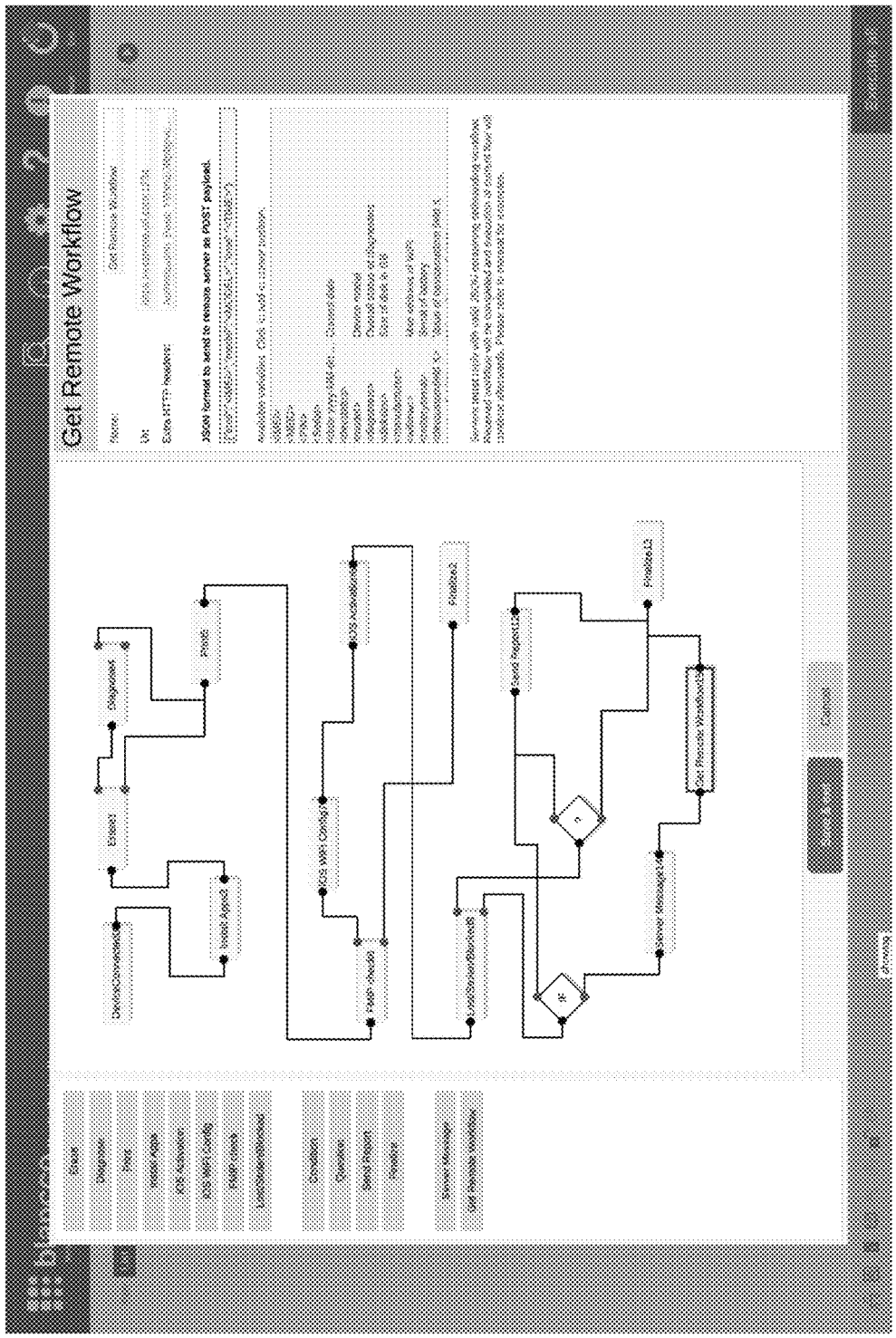
Figure 16:
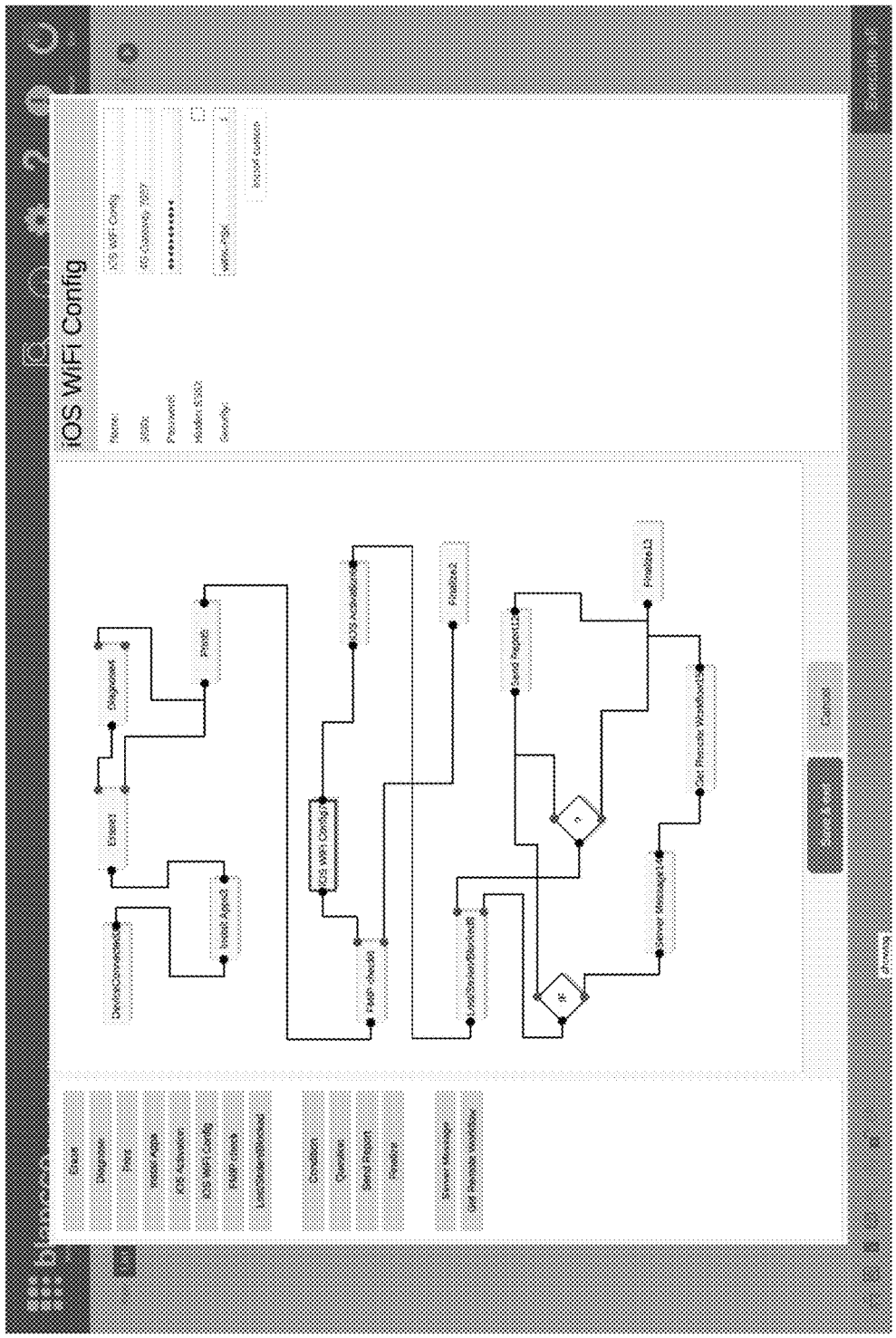

FIGS. 7, 8 and 9 show an example conditional element. In the information panel, a user can define the condition to be satisfied. In this case, the condition is an "IF" statement. In some embodiments, the condition can be written in any suitable code or programming language, for example, JavaScript Object Notation.

FIGS. 10, 11, 12, 13, 14, 15 and 16 show an example of a workflow element representing the action of retrieving a remote workflow. A remote workflow can be embedded inside a workflow as a workflow element. In some embodiments, a workflow element representing the action of getting a remote workflow is inserted into the workflow panel and this workflow element is expanded to include all the workflow element of the remote workflow.

Figure 17:
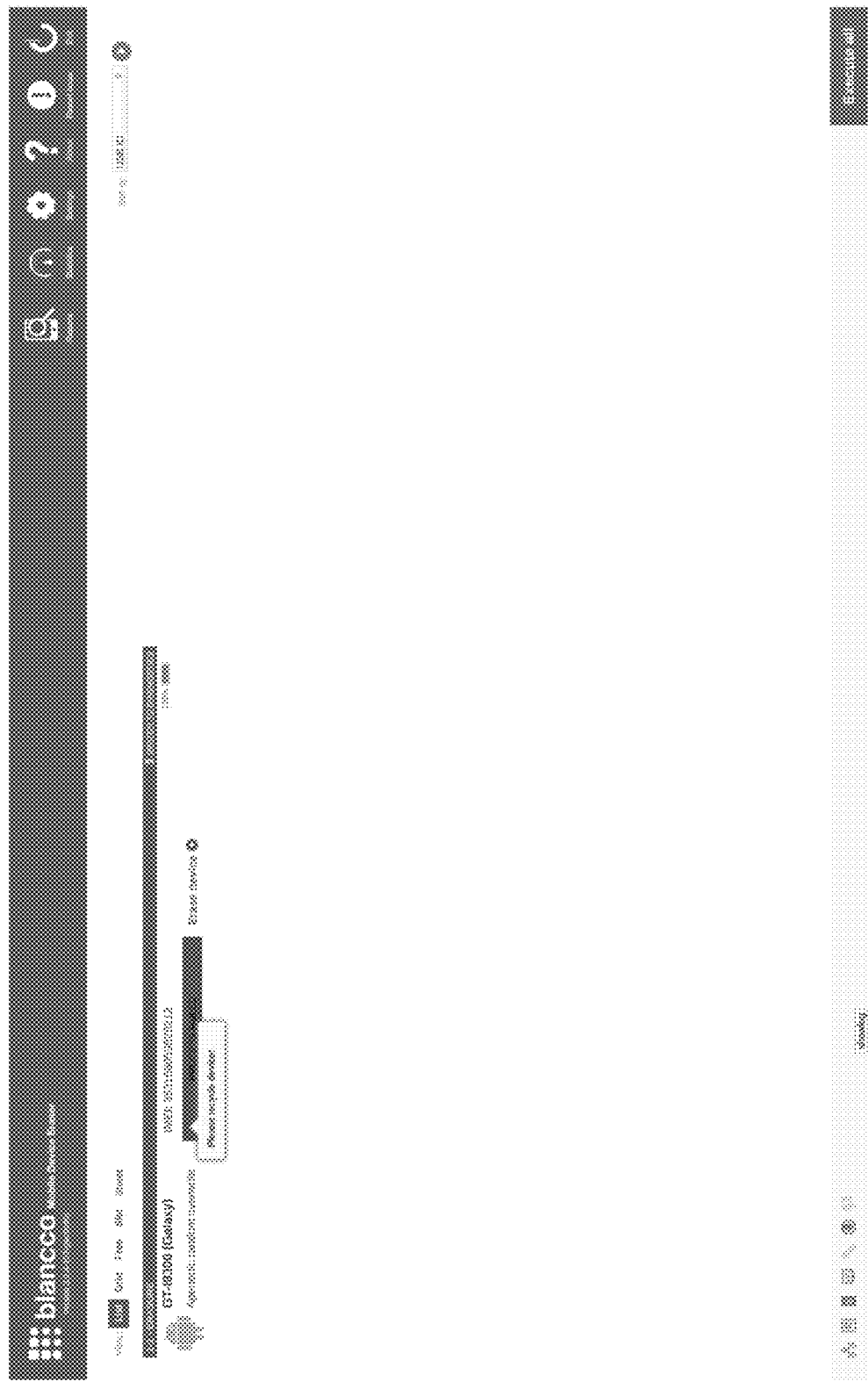
Figure 18:
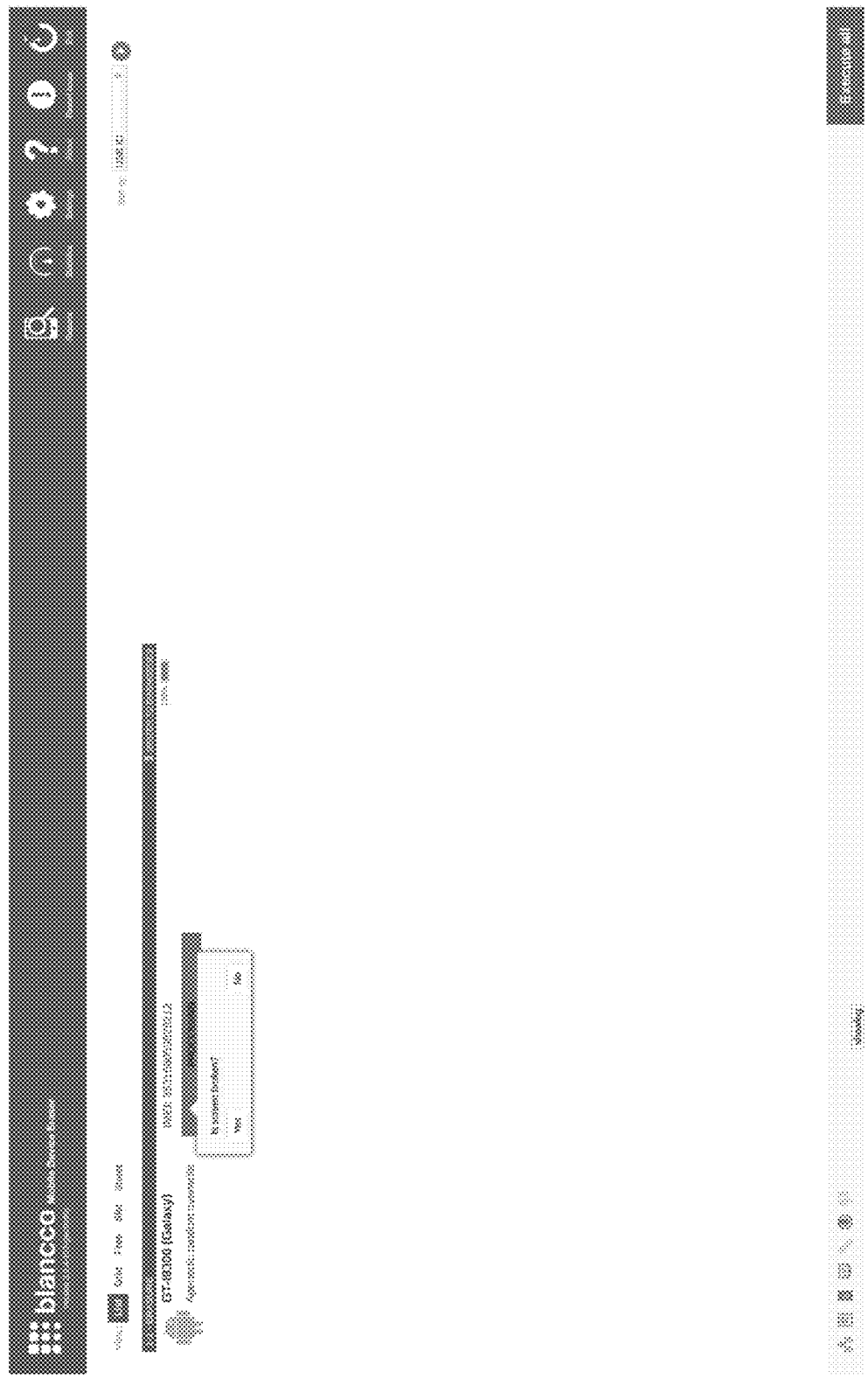

FIGS. 17 and 18 show an alternative graphical representation of the workflow to be presented to an operator. The alternative representation includes displaying a workflow element representing a single action to the operator at a single time. The alternative representation may include a progress bar and/or further information about the device under test. The graphical representation may include instructions to the user after different outcomes of an action. For example, as shown in FIG. 17, if a data erasure process fails, an instruction to recycle the device is presented.

References to a user can equally be taken to be references to an operator and vice versa.

Construction of workflows and performance of procedures for both erasure and diagnostics can be complex. Some customers wanted to do diagnostics and then erasure. We then added a dropdown to choose order. We then added more and more functionality. The order and flow got too many requests and the settings hard to understand due to all options.

It may be desirable to provide wanted functionality with static, preconfigured settings.

Two aspects may be provided, either separately or combined

1. Dynamic workflows. A goal of having workflows instead of normal settings is that the customer can totally freely define their own workflows based on the action (functionality) we provide. A customer can start with 3 diagnostic tests to test if the phone works as it should. Based on this outcome the workflow can erase the device and based on that outcome do more tests for example.

In the screenshot of FIG. 3 a workflow editor is shown, where the customer can create their own workflows. The actions to the left can be dragged and dropped in the work area in the middle. When clicking one action on the work area the properties for that action comes up to the right. The actions are connected with lines to bind them together.

Customer can base workflows ways on action output, questions to operator or values gathered from the device that we currently are working on (like model, serial nr etc).

Customer can build many different roads and theoretically infinitely large workflows. This provide each customer the possibility to use the software exactly according to their process without us need to change anything in our software.

2. Remote dynamic workflows. The above system of aspect 1. may be totally dynamic based on locally existing values. Information from a remote system may be gathered to either make decisions in the workflow or totally automate the process.

When creating the workflow in the workflow editor one action is to connect to a remote system. That can be an asset management system or any kind of business intelligence system. If workflow as operator question "Is screen broken?" the workflow can ask the remote system what to do next. The remote system might check the value of the device and based on that inform the operator if the device should be discarded or not.

The remote server can also provide a whole workflow. As soon as a device is connected the remote server can be given information about the device and based on that a whole workflow is sent over to our software. This means that the remote server can make even choices between different workflows. Can be based on what kind of device or previous owner of device as example.

Due to the dynamic input coming to our system the operator don't need to make any decisions on his own but rely on the automatic system. Meaning less human mistakes and less to teach new operators.

A skilled person will appreciate that variations of the enclosed arrangement are possible without departing from the invention. Accordingly, the above description of the specific embodiments is made by way of example only and not for the purposes of limitations. It will be clear to the skilled person that minor modifications may be made without significant changes to the operation described.

What is claimed is:

1. A method for providing at least one of erasure of data from, or diagnosis of at least one condition of, a device, the method comprising:
   providing a stored set of actions, wherein the stored set of actions includes at least one of:
   a) at least one erasure action that includes sending data or instructions to a storage device that includes a memory to delete or overwrite data stored in at least a region of the memory, or
   b) at least one diagnosis action to determine at least one property of the device;
   selecting actions from the stored set of actions and linking the actions to generate a sequence of actions; and
   outputting, storing or performing the generated sequence of actions, wherein performing the sequence of actions comprises performing at least one of the actions in dependence or based on data representative of:
   at least one property of the device, or a customer or client or business preference or requirement, or a regulatory requirement,
   wherein a user interface is configured to display graphical representations of actions of the stored set of actions,
   wherein the user interface and a processing resource are responsive to at least one of movement or insertion of the graphical representations of actions of the stored set of actions so as to form the linked sequence of actions and
   wherein the user interface is further configured to display graphical representations of links of a stored set of links, and based on user input to at least one of insert or move at least some of the graphical representations of the links within at least one window, thereby to link at least some of the actions.

2. A method according to claim 1, wherein the user interface is configured to, based on user input, at least one of insert or move at least some of the graphical representations of the actions within at least one window.

3. A method according to claim 2, wherein the user interface is configured to display graphical representations of actions of the stored set of actions, and based on user input to insert or move at least some of the graphical representations of the actions within at least one window.

4. A method according to claim 1, further comprising providing a set of links of different types, and the linking comprises selecting at least one link from the set of links of different types to link at least two of said selected actions.

5. A method according to claim 4, wherein the link or at least one of the links comprises or represents an instruction to proceed from one of the actions to another of the actions.

6. A method according to claim 5, wherein the link or at least one of the links comprises or represents an instruction to proceed from one of the actions to another of the actions subject to an output or outcome of at least one logical operation.

7. A method, according to claim 1, comprising generating the sequence of actions to be executable to perform a desired erasure procedure or a desired diagnostic procedure.

8. A method, according to claim 7, wherein generating the executable sequence of actions comprises transmitting an executable program or dataset to a further apparatus.

9. A method, according to claim 1, comprising obtaining the data from a remote source.

10. A method according to claim 1, wherein the erasure action consists of at least one of a file overwriting procedure, a data overwriting procedure, and a cryptographic erasure procedure.

11. A method according to claim 1, wherein the device consists of at least one of a portable device, phone, a smartphone, a tablet, a laptop computer, a desktop computer, a portable electronic device, a music device, and a video device.

12. A method according to claim 1, wherein the memory consists of at least one of a Self-encrypting Drive (SED), a Hard Disk Drive (HDD), a Solid State Drive (SSD), Non-Volatile Memory, flash memory, NAND flash memory, Random Access Memory (RAM), 3D Cross Point, Re Ram, and Phase Change Memory.

13. A system for providing at least one of erasure of data from, or diagnosis of at least one condition of, a device, the system comprising:
 a processing resource configured to display or perform a sequence of actions,
 wherein the sequence of actions includes at least one of:
  a) at least one erasure action that includes sending data or instructions to a storage device that includes a memory to delete or overwrite data stored in at least a region of the memory, or
  b) at least one diagnosis action to determine at least one property of the device,
 wherein the processing resource is configured to perform, display or select at least one of the actions in dependence or based on data representative of at least one property of the device, or a customer or client or business preference or requirement, or a regulatory requirement,
 wherein a user interface is configured to display graphical representations of actions of the stored set of actions,
 wherein the user interface and the processing resource are responsive to at least one of movement or insertion of the graphical representations of actions of the stored set of actions so as to form the linked sequence of actions and
 wherein the user interface is further configured to display graphical representations of links of a stored set of links, and based on user input to at least one of insert or move at least some of the graphical representations of the links within at least one window thereby to link at least some of the actions.

14. A system, according to claim 13, comprising: a stored set of actions, wherein the stored set of actions includes at least one of
 a) at least one erasure action that includes sending data or instructions to a storage device that includes a memory to delete or overwrite data stored in at least a region of the memory, or
 b) at least one diagnosis action to determine at least one property of the device; and
 the user interface configured to enable a user to select a plurality of actions from the stored set of actions and to link the selected actions to produce the sequence of actions.

15. A system, according to claim 13, wherein the processing resource is configured to generate a sequence of actions to be executable to perform a desired erasure procedure or a desired diagnostic procedure.

16. A system, according to claim 15, wherein generating the executable sequence of actions comprises transmitting an executable program or dataset to a further apparatus.

17. A system, according to claim 13, wherein the processing resource is configured to obtain the data from a remote source.

18. An article of manufacture including a non-transitory, tangible computer readable storage medium having instructions stored thereon that, in response to execution by a computer-based system, cause the computer-based system to perform operations comprising:
 generating a graphical user interface that displays graphical representations of actions of a stored set of actions, wherein the stored set of actions includes at least one of:
  a) at least one erasure action that includes sending data or instructions to a storage device that includes a memory to delete or overwrite data stored in at least a region of the memory, or
  b) at least one diagnosis action to determine at least one property of a device;
 receiving user input and, based on the user input, insert or move at least some of the graphical representations of the actions within at least one window of the graphical user interface thereby to generate a linked sequence of actions; and
 outputting, storing or performing the generated sequence of actions,
 wherein the graphical user interface is configured to display graphical representations of actions of the stored set of actions,
 wherein the graphical user interface and a processing resource are responsive to at least one of movement or insertion of the graphical representations of actions of the stored set of actions so as to form the linked sequence of actions and
 wherein the graphical user interface is further configured to display graphical representations of links of a stored set of links, and based on user input to at least one of insert or move at least some of the graphical representations of the links within at least one window thereby to link at least some of the actions.

* * * * *